Jan. 1, 1952 R. L. THOMPSON 2,581,218
INTERLOCKING MECHANISM FOR REGISTER APPARATUS
Filed Dec. 20, 1946 3 Sheets-Sheet 1
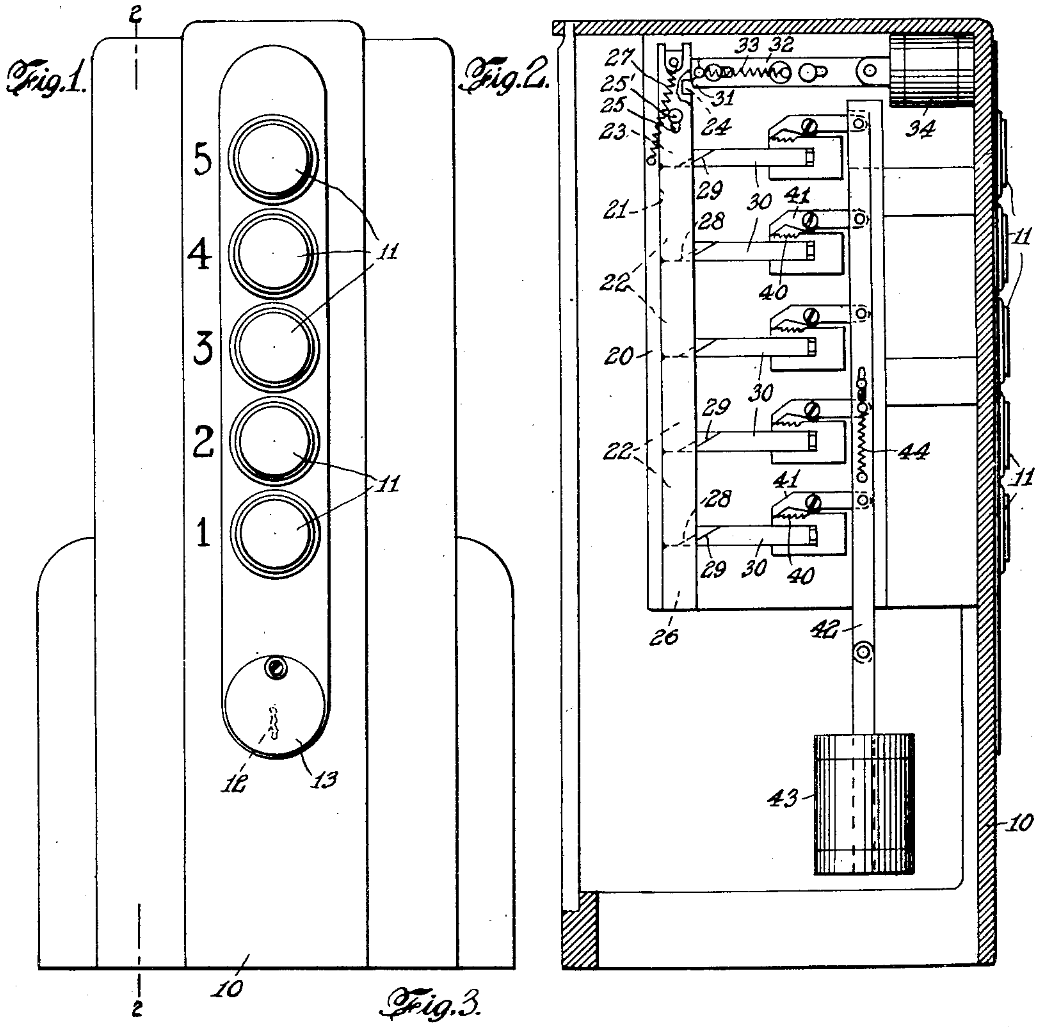
Fig. 1. Fig. 2. Fig. 3.
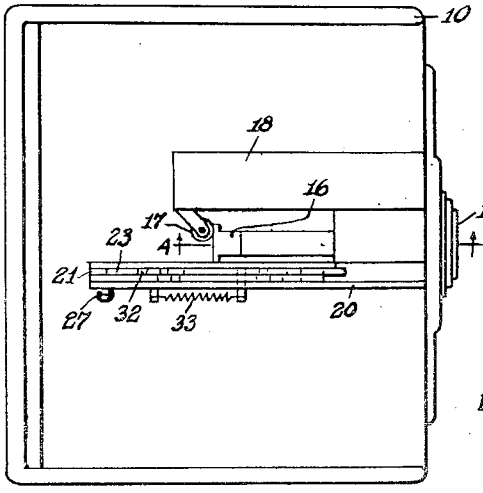
Fig. 4.
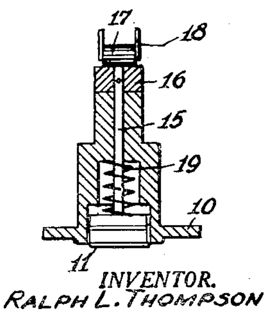
INVENTOR.
RALPH L. THOMPSON
BY [signature]
ATTORNEY.

INTERLOCKING MECHANISM FOR REGISTER APPARATUS

Filed Dec. 20, 1946 3 Sheets-Sheet 2

INVENTOR.
RALPH L. THOMPSON
BY
[signature]
ATTORNEY.

INVENTOR.
RALPH L. THOMPSON
BY Fred L. Schuetz
ATTORNEY

Patented Jan. 1, 1952 2,581,218

UNITED STATES PATENT OFFICE 2,581,218

INTERLOCKING MECHANISM FOR REGISTER APPARATUS

Ralph L. Thompson, Mineola, N. Y., assignor to Gerard V. Smith, Westwood, N. J.

Application December 20, 1946, Serial No. 717,533

15 Claims. (Cl. 74—483)

The invention relates to registers and more especially to manually controlled mechanism for operating counters, for example, as may be employed in classifying toll payments for vehicles travelling over highways and/or bridges.

In devices of this nature, the collector, upon receiving the toll, enters the particular classification of vehicle by pushing the appropriate button of the register. In order to prevent the collector from pushing two buttons at the same time, which would permit him to record one fare without visible external signs of such recording, there has been installed with these registers a mechanical interlock mechanism, for example, such as is set forth in U. S. Letters Patent #2,086,605. It has been found, however, that while it is then no longer possible to operate two of the keys or buttons at the same time, said interlock mechanism still allows of one button following the other in such rapid sequence that the value of the visual indicator is lost. In other words, the second button can be depressed so quickly after the first one has been depressed that the symbol of the first button only appears as an instantaneous and not as an identifiable signal on the indicators. It has become a requirement, therefore, that all further control of that particular registration, as well as of the succeeding ones, should be removed for a given interval of time from the collector. For example, by this cycling of operations, once a given button was depressed, the classification light should remain extinguished for a fixed interval of time and then would become illuminated and remain so for a predetermined interval of time. If, during the dual intervals, a collector attempted to record a further transaction, the circuit to the recording counters would be opened and thus, even though the button were depressed, the recording or registration of that fare would not take place.

The present invention has for an object to provide an interlocking mechanism and circuit whereby not only will the hereinbefore requirements be met, but it will not be possible to partly depress a button and then restore it to normal position in order to change the contemplated registration, for example, in becoming aware of the presence of a supervisor.

Another object of the invention is to provide an interlocking mechanism whereby once a registration operation has been initiated, as in applying pressure to a particular button, such action must be completed to restore the mechanism to normal condition.

Still another object of the invention is to afford locking means for the mechanism so that a key or the like is required to render it suitable for use, and thus to prevent casual operation of the fare box by an unauthorized person.

A further object of the invention is to provide means for causing a button, when operated, to remain in its actuated position for a predetermined interval of time; also, to provide means to retain the button, upon its return to normal position, for a predetermined interval of time in such position.

A still further object of the invention is to provide a compact and rugged device for accomplishing the aforesaid purposes, and a device which shall be simple and relatively inexpensive to manufacture, as well as smooth and positive in its operation; also, to provide a device which may be adapted readily to the existing types of keyboxes now in common use, without requiring any major change therein.

An additional object of the invention is to provide means to restore automatically an actuated button to its normal position prior to withdrawal of the manually controlled operation-initiating key.

In carrying out the invention, a ratchet element is attached to or made an integral part of each of the movable button elements provided for initiating a registration, and this ratchet element is adapted for engagement with a swingable pawl element—one being provided for each ratchet element. The various pawl elements are fulcrumed to a fixed portion of the framing or casing of the interlocking mechanism and the respective non-engaging ends thereof are pivotally connected, with provision for slight lost motion, to a reciprocable bar whose reciprocations are controlled by an electro-mechanical time delay device, as for effecting engagement with or release of a pawl element from its associated ratchet element.

Upon movement of a plunger in initiating the depression of a button, the corresponding ratchet element, which is normally contacted by a pawl element, prevents return of said plunger, at least not until the latter has been completely depressed. This movement of a plunger is utilized in the usual manner to operate only upon complete depression of the plunger a suitable switch for control of electrical circuits, one of which controls, in the instant embodiment, a time delay device, and another of which operates the counter mechanism and controls the classification light of the signalling system customarily associated with the corresponding indication of the register. Upon completion of the predetermined time interval, the first-named circuit causes movement of the reciprocable bar controlling the pawl elements which are thereby withdrawn from their engagement with the respective ratchet elements, thus permitting spring return means to function for returning a depressed button or displaced key to its normal inoperative position.

With the release of the pawl elements, however, provision is made to prevent subsequent actuation of any plunger until such time as the pilot or signal light, controlled by a plunger operation upon release of a pawl by the reciprocable bar, shall have remained illuminated for a predetermined interval of time. Normally, the said bar is retained in a position wherein the pawls engage the respective ratchet teeth to lock the said plungers against return movement; and by providing suitable and controlled spring loading means for the bar itself as well as detent locking means preventing operation in the reverse direction, actuation of the buttons or keys is prevented except in accordance with a predetermined cycle.

Actuation of more than one plunger at a time is prevented through the provision of respective latch elements which are movable with the corresponding plungers and are adapted for insertion between juxtaposed blocks longitudinally displaceable thereby to a limited extent. When these blocks are so displaced, they remain in direct end-to-end contact with one another, except where an insertion has been effected, and are incapable of further displacement, thus blocking insertion of additional latching elements of other plungers. Subsequent depression of the respective remaining buttons or movement of respective keys is thus prevented. Release of the blocks from this forced separation is prevented by a spring-urged, locking block detent member engaging an end block of the series of blocks and by the pawl under control of the said reciprocatory release bar which serves to swing all pawl elements out of engagement.

The nature of the invention, however, will best be understood when described in connection with the accompanying drawings, in which:

Fig. 1 shows in front elevation the novel register casing with operating buttons.

Fig. 2 is a vertical section thereof taken on the line 2—2, Fig. 1 of the drawings, and looking in the direction of the arrows and with a panel plate removed.

Fig. 3 is a plan view with the top cover plate removed.

Fig. 4 is a fragmentary longitudinal section taken on the line 4—4, Fig. 3 of the drawings, and looking in the direction of the arrows.

Figures 5, 6, 7:
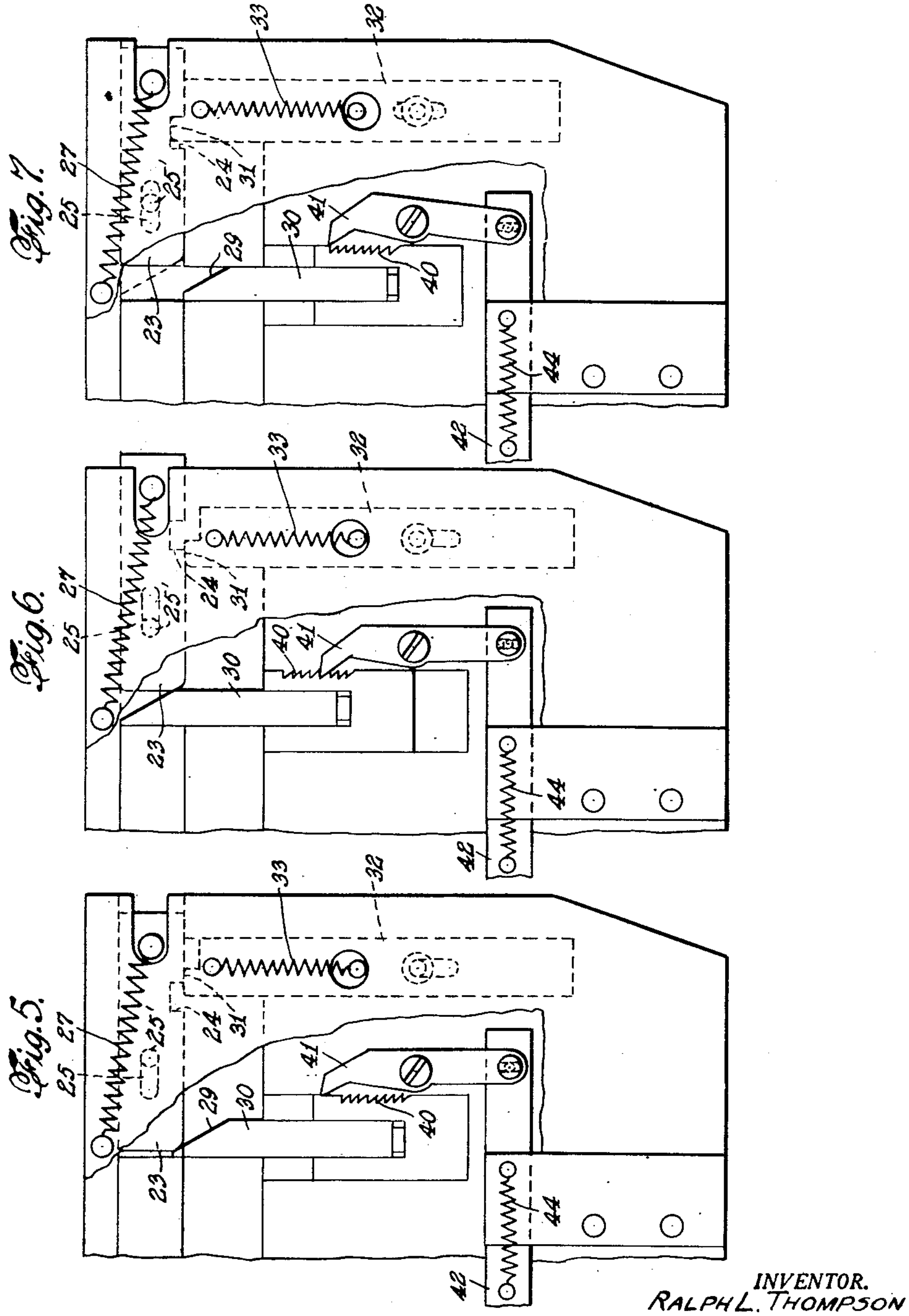
Figs. 5, 6 and 7 are fragmentary elevational views, on an enlarged scale and with a portion of the mounting panel broken away, illustrating different stages in the operation of the mechanism.

Referring to the drawings, 10 designates a suitable casing for housing the novel mechanism, said casing having a front plate provided with a succession of operating buttons or keys 11 externally accessible for manual operation, and a key-slot switch member 12 preferably covered by an oscillatable cover plate 13.

The button members 11 continue inwardly into the housing as plungers 15 bearing at their respective inner ends operating blocks 16 for engaging rollers 17 of corresponding toggle switches 18 to actuate the same. These switches may be of any well known or special design, for example, a toggle switch such as is set forth in U. S. Letters Patent #2,086,605 granted July 13, 1937, to Benjamin Cooper. A spring 19 is provided about each of the plungers between a button and the casing to return a button with plunger to the normal outward location wherein a button is substantially flush with the outer face of the casing wall, all of which is well understood and forms no particular part of the present invention.

Interlocking mechanism, however, is associated with the various plungers, being mounted, for example, upon a plate or panel 20 secured to the casing within the same and comprising parallel separated walls. This panel along one edge provides a longitudinal guideway 21 in which are located displaceable blocks 22, preferably of rectangular shape, one block being provided for each plunger. The end block 23, however, differs from the remaining blocks, being of somewhat greater length and is provided with a notch 24 along one edge as well as with a longitudinal slot 25 into which extends a fixed pin 25' for limiting the displacement of said block and through it, the displacement of the remaining blocks which normally are located end-to-end. An abutment 26 is provided for the succession of blocks at the end opposite block 23. The succession of blocks thus normally provides in effect a substantially continuous bar, the end block 23 being urged in the direction of the abutment 26 through a retractile spring 27 attached thereto and to the panel 20. Each block, furthermore, is bevelled at a corresponding corner 28 to receive the bevelled end 29 of a latch element 30 movable each with its corresponding plunger when the same is depressed by exerting manual pressure upon a button or key 11, as is the usual practice when it is desired to record the class of toll payment represented by the particular button.

In accordance with the invention, a latch element is designed to enter between two adjacent blocks to effect a displacement of a section of the series included between the particular engaged block and the end block 23, and in the direction of said end block, abutment 26 preventing movement in the opposite direction. Such displacement, however, may not occur, and therefore depression of the plunger is prevented, until release is effected from end block notch 24 of a detent 31 of a detent-locking bar 32 slidably mounted on the panel. Said locking bar is spring-urged by means of spring 33 in the direction of said notch 24 and is under control of a solenoid 34, as will hereinafter be more fully set forth.

Furthermore, the extent of displacement permitted the end block 23, through the pin and slot engagement hereinbefore described, permits of the insertion of but a single latch element so that not more than one of these elements may be actuated at a time over an appreciable distance. Provision is made, also, to prevent the return of a plunger with latch element, once it has been depressed, until a certain cycle has been completed, as will be more fully set forth. This is effected by providing each latch element with ratchet teeth 40, the same being normally engaged by a corresponding bell-crank pawl element 41 which will permit movement past the pawl in the direction corresponding to a depression of the button for entering a latch between two adjacently disposed blocks. Return of the plunger is thus prevented until disengagement of its pawl is had which is effected, for example, by pivoting a pawl to the panel 20 and attaching its non-engaging end to a reciprocable release bar 42, said bar being under control, for example, of a solenoid 43, as will be hereinafter more fully set forth. Normally, the bar is extended, in a direction to hold the pawls in engagement, under the influence of a loading spring 44.

It will be understood, of course, that all of the pawls are released simultaneously from their respective ratchets upon movement of the release bar 42 in the proper direction and, correspondingly, all are engaged therewith when the said bar is operated in the reverse direction, as under the influence of said spring 44 upon de-energization of the solenoid 43.

Figure 8:
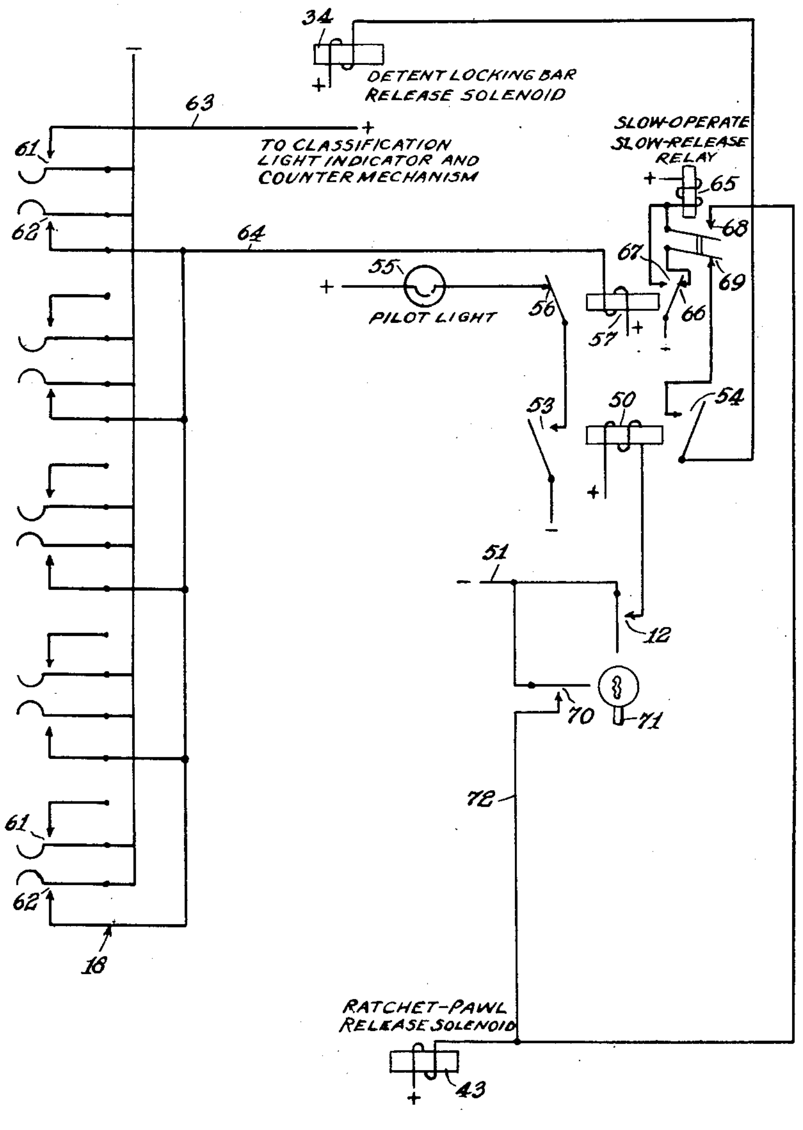
Fig. 8 is a wiring diagram illustrating the electrical circuits and control means.

The electrical control in the operation of the novel apparatus is as follows, reference being had more particularly to the wiring diagram, Fig. 8 of the drawings. When the key box is to be put in operation, it is necessary first to energize a solenoid or other electromagnetic means for displacement longitudinally of the detent locking bar 32 out of its detent locking position (Figs. 5 and 6). To this end, the relay 50 is designed to be energized from a suitable source of power as the circuit 51, for example by the closing of the key-operated switch 12 included in series in said circuit.

The energization of relay 50 effects the closing of two circuits at the contacts 53 and 54, the former circuit including a pilot light 55 which indicates that the key box apparatus is in operation. There is included also in this circuit, in series, a further contact 56 controlled by a relay 57. The other circuit controlled by relay 50 through the contacts 54, now closed, energizes the lock release solenoid 34 to move the locking bar 32 axially, so that a selected button of the various push buttons 11 corresponding to the different classes of toll payments is free to be depressed, as hereinbefore described.

As soon as a button of the group is thus manually depressed to the full extent (Fig. 6) for effecting recording of the particular class of toll paid, it becomes locked automatically in the depressed location and affects the corresponding toggle switch 18, as hereinbefore described. The actuation of the toggle switch serves to close, through the particular pair of switch elements 61 and 62 thereof associated with a button, controlling circuits 63 and 64, respectively. One of the switch elements, as the switch 61, thus closes the circuit 63 to a suitable counter mechanism (not shown) and extinguishes the classification light indicator (not shown), as is the general practice.

The other circuit 64 is designed to control a time-delay or time-cycle relay 65 through energization of the relay 57, it being understood that operation of any of the buttons will thus affect the two circuits 63 and 64, said button-controlled switch elements 61, 62 being connected in parallel therewith. Energization of relay 57 operates to open at the contacts 56 the circuit to pilot light 55 to indicate to the collector that he is not to attempt to depress a further button; as well as to open the circuit to locking bar release solenoid 34 at the contacts 66, thus restoring the detent condition for locking action on the buttons through the blocks 22.

The said energized relay 57 also effects closing, at contacts 67, of a circuit to the time-cycle or time-delay relay 65 such as of well known types of telephone slow-operate and slow-release relays. At the end of a predetermined period, approximately one second, said relay 65 operates to close, at the contacts 68, a circuit to the ratchet release solenoid 43 operating on the various pawls of the push button plungers to withdraw the same from the corresponding ratchets (Fig. 7), so that a particular depressed button will automatically be restored to its normal position (Fig. 5) under the influence of the spring 19. The blocks 22 are then free to return to their normal mutually contacting state under the movement of the notched end block as influenced by the attached spring 27. The detent 31 of the locking bar will then snap into the notch 24 (Fig. 7) as the displaced blocks return to prevent temporarily outward endwise displacement thereof. At the same time, the circuit to solenoid 34 is additionally interrupted at the contacts 69 so that when relay 57 subsequently becomes de-energized, the solenoid 34 will not be re-energized immediately through closing at contacts 66 to release the blocks.

Return of a push button to normal position interrupts the circuits to the counter mechanism and to relay 57; and, through contacts 67 controlled by the said relay, the circuit to the relay 65. Upon de-energization of this latter relay, after a predetermined interval (approximately one second), the circuit to solenoid 34 is closed at contacts 69 of said relay 65 to energize again said lock-release solenoid 34 (contacts 66 having in the meantime been closed by the de-energization of relay 57) for release of detent locking bar 34, and thereby to unlock the buttons for further operation.

In case of removal intentionally or unintentionally of a key from the key slot of switch 12 prior to the operation of relay 65 and failure thus of the solenoid 43 to be energized to withdraw the pawls so as to restore a button, provision is made to close the circuit to said solenoid 43, as through a further key-operated pair of contacts 70. For example, in rotating a key element 71 to permit key withdrawal from the key slot, it closes momentarily the contacts 70 which are included in a circuit 72 by-passing the switch 12.

I claim:

1. In a keyboard: the combination with a casing, a plurality of externally accessible, manually depressible members mounted therein, and a circuit controlling member for each member for actuation respectively thereby upon complete depression of a corresponding member; of means associated with the respective depressible members normally preventing retraction of a depressed member; and displaceable means engageable by the respective depressible members adapted for accommodation of but a single one at a time; a reciprocable member adapted to block displacement of the displaceable means, together with means acting to urge the reciprocable blocking member in a direction to prevent displacement of the displaceable means; and a plurality of electrically operated means for releasing in predetermined sequence the reciprocable displaceable means blocking member and the retraction preventing means.

2. A keyboard according to claim 1, wherein electrically operated means are provided whereby the sequential releases of the displaceable means blocking member and the retraction preventing means are accomplished automatically subsequent to the depression of a depressible member.

3. A keyboard according to claim 1, wherein a means is provided for each depressible member acting thereon to return the same automatically upon release of the retraction preventing means.

4. A keyboard according to claim 1, wherein a time-cycle control means under control of any of the said circuit controlling members actuated by a depressible member is provided to control the sequential release of the displaceable means blocking member and the depressible member retraction preventing means.

5. A keyboard according to claim 1, wherein the displaceable means comprises a plurality of adjacently disposed block elements located between a fixed abutment and an end block element having a limited displacement and spring-urged in the direction of said abutment, and the depressible members include corresponding latch elements for insertion between two adjacent block elements upon depression of a corresponding depressible member.

6. A keyboard according to claim 1, wherein the displaceable means comprises a plurality of adjacently disposed block elements located between a fixed abutment and an end block element having a limited displacement and spring-urged in the direction of said abutment, the depressible members include corresponding latch elements for insertion between two adjacent block elements upon depression of a corresponding depressible member, and the limited displacement block element is adapted for engagement by the reciprocable blocking member to retain substantially in end to end abutting relationship all of the elements.

7. A keyboard according to claim 1, wherein the means for preventing retraction of a depressible member comprises pawl and ratchet means.

8. A keyboard according to claim 1, wherein the means for preventing retraction of a depressible member comprises pawl and ratchet means, and a reciprocable member is attached to all of the pawl elements of the respective pawl and ratchet means to swing the same simultaneously out of engagement with the corresponding ratchet element.

9. A keyboard according to claim 1, wherein the means for preventing retraction of a depressible member comprises pawl and ratchet means, a reciprocable member is attached to all of the pawl elements of the respective pawl and ratchet means to swing the same simultaneously out of engagement with the corresponding ratchet element, and means are provided for reciprocating said reciprocable member.

10. A keyboard according to claim 1, wherein a slow-operate, slow-release relay means is controlled by any of the circuit controlling members to control sequentially the release of the limited displacement block element and the retraction preventing means to allow return of a depressible member to normal position.

11. A keyboard according to claim 1, wherein the limited displacement block element is notched and a detent locking bar is spring-urged toward the notch for engagement therewith, and means are provided for withdrawing the said bar from engagement in said notch.

12. A keyboard according to claim 1, wherein a switch member manually operable by a key is provided to control the power supply for the operation of the plurality of electrically operated means controlling the release in predetermined sequence of the displaceable means and the release of the retraction-preventing means; and a further and emergency switch member also operable by a key in withdrawing the same is provided for effecting an independent control of the electrically operated means controlling the release of the retraction preventing means to insure return of a depressed member to its normal position.

13. In a keyboard: the combination with a casing, a plurality of switches therein, and a plurality of manually depressible buttons mounted in the face of the casing and each provided with a stem movable therewith, resilient means associated with the respective buttons for retaining normally the same in non-depressed position, the ends of said stems being adapted for contact with the respective switches, and respective latch elements movable with the corresponding stems; of pawl and ratchet means associated with said latch elements for preventing return of a stem and button when the latter has been depressed; a series of longitudinally displaceable, adjacently disposed blocks movably mounted in the casing and presenting normally an abutment to movement of the latch elements therebetween and thus depression of a corresponding button, said latch elements being adapted for insertion individually between corresponding adjacent blocks when the series is released for longitudinal displacement, and means to confine the extent of displacement of the blocks to accommodate but a single latch element at a time; means to control the release of the series of blocks and the locking of the same; and means to release simultaneously the pawl and ratchet means of all of the buttons.

14. A keyboard according to claim 13, wherein the means to control the release and locking of the series of blocks and the means to control the release simultaneously of the pawl and ratchet means of all of the buttons are electrically actuated and control means therefor are provided whereby after depression and locking of a button release thereof occurs a predetermined interval prior to the release of the blocks.

15. In a keyboard: the combination with a casing, a plurality of externally accessible, manually depressible members mounted therein, and a circuit controlling member for each depressible member for actuation respectively thereby upon complete depression of a corresponding member; of individual mechanical means associated with the respective depressible members normally preventing retraction of a depressed member; and electrical means actuated by movement of any depressible member through operation of its circuit controlling member, together with a member controlled by said latter electrical means and common to all of the retraction preventing means for release automatically of the latter after a predetermined interval following depression of a manually depressible member, and further electrical means including electrically operated delay means whereby all of the depressible members are maintained automatically against actuation for a predetermined interval after restoration of a depressible member to its retracted position.

RALPH L. THOMPSON.

REFERENCES CITED

The following references are of record in the file of this patent:

UNITED STATES PATENTS

| Number | Name | Date |
|---|---|---|
| 1,378,950 | Hargan | May 24, 1921 |
| 1,773,392 | Eichenauer | Aug. 19, 1930 |
| 2,192,621 | Radtke | Mar. 5, 1940 |
| 2,231,365 | Matthew | Feb. 11, 1941 |
| 2,289,513 | Mastney | July 14, 1942 |
| 2,293,127 | Fishack | Aug. 18, 1942 |